US011338636B2

(12) United States Patent
Winter et al.

(10) Patent No.: US 11,338,636 B2
(45) Date of Patent: May 24, 2022

(54) X-SHAPED SPRING DEVICE FOR A MOTOR VEHICLE WHEEL SUSPENSION SYSTEM

(71) Applicant: VOLKSWAGEN AKTIENGESELLSCHAFT, Wolfsburg (DE)

(72) Inventors: Ingo Winter, Isenbüttel (DE); Sierk Fiebig, Salzgitter (DE); Nils Schiwiora, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 17/272,678

(22) PCT Filed: Jun. 18, 2019

(86) PCT No.: PCT/EP2019/065926
§ 371 (c)(1),
(2) Date: Mar. 2, 2021

(87) PCT Pub. No.: WO2020/048655
PCT Pub. Date: Mar. 12, 2020

(65) Prior Publication Data
US 2021/0268856 A1    Sep. 2, 2021

(30) Foreign Application Priority Data

Sep. 5, 2018   (DE) ..................... 10 2018 215 111.3

(51) Int. Cl.
*B60G 11/08*    (2006.01)
*B60G 3/28*     (2006.01)
*B60G 11/10*    (2006.01)
*B60G 21/05*    (2006.01)

(52) U.S. Cl.
CPC .............. *B60G 11/08* (2013.01); *B60G 3/285* (2013.01); *B60G 11/10* (2013.01); *B60G 21/05* (2013.01);

(Continued)

(58) Field of Classification Search
CPC .......... B60G 11/08; B60G 3/28; B60G 3/285; B60G 11/10; B60G 21/05;
(Continued)

(56) References Cited

U.S. PATENT DOCUMENTS 1,292,166 A    1/1919 Voight
1,375,556 A    4/1921 Burnett
(Continued)

FOREIGN PATENT DOCUMENTS

DE    344355 C    11/1921
DE    3243434 A1   5/1984
(Continued)

OTHER PUBLICATIONS

Description Translation for JP H058625 from Espacenet (Year: 1993).*

(Continued)

*Primary Examiner* — James A English
*Assistant Examiner* — Daniel M. Keck
(74) *Attorney, Agent, or Firm* — Barnes & Thornburg, LLP

(57) ABSTRACT

An X-shaped spring for a transportation vehicle wheel suspension system having, per wheel side, a first leaf spring and a second leaf spring made from fiber-reinforced arranged to lie above one another and combined at a respective first end on a first fastening device for transportation vehicle body-side support, wherein the first leaf spring has a second fastening device at its second end for wheel-side support, and the second leaf spring is supported at its second end on the transportation vehicle body side. Towards its second end, the second leaf spring is an arc section curved away from the first leaf spring.

16 Claims, 2 Drawing Sheets

(52) U.S. Cl.
CPC .. *B60G 2202/114* (2013.01); *B60G 2204/121* (2013.01); *B60G 2204/82* (2013.01); *B60G 2204/8302* (2013.01); *B60G 2206/428* (2013.01); *B60G 2206/7101* (2013.01)

(58) Field of Classification Search
CPC ........ B60G 2202/114; B60G 2202/116; B60G 2202/117; B60G 2204/121; B60G 2204/82; B60G 2204/8302; B60G 2206/428; B60G 2206/7101; B60G 3/10; B60G 2200/1422; B60G 2200/143
See application file for complete search history.

(56) References Cited

U.S. PATENT DOCUMENTS

| | | |
|---|---|---|
| 1,586,510 A | 5/1926 | Houx |
| 1,789,845 A | 1/1931 | Shore |
| 10,889,154 B2 | 1/2021 | Winter |
| 2004/0195901 A1* | 10/2004 | Momiyama .......... B60G 11/465 301/5.1 |

FOREIGN PATENT DOCUMENTS

| | | |
|---|---|---|
| DE | 102011083173 A1 | 3/2013 |
| DE | 102013209648 A1 | 11/2014 |
| DE | 102016220325 A1 | 4/2018 |
| GB | 152015 | 11/1921 |
| JP | H058625 A | 1/1993 |
| WO | 8702316 A1 | 4/1987 |

OTHER PUBLICATIONS

Search Report for International Patent Application No. PCT/EP2019/065926; dated Oct. 24, 2019.

* cited by examiner

X-SHAPED SPRING DEVICE FOR A MOTOR VEHICLE WHEEL SUSPENSION SYSTEM

PRIORITY CLAIM

This patent application is a U.S. National Phase of International Patent Application No. PCT/EP2019/065926, filed 18 Jun. 2019, which claims priority to German Patent Application No. 10 2018 215 111.3, filed 5 Sep. 2018, the disclosures of which are incorporated herein by reference in their entireties.

SUMMARY

Illustrative embodiments relate to an X-shaped spring device for a transportation vehicle wheel suspension, comprising for each wheel side a first leaf spring and a second leaf spring of fiber-reinforced plastics material which are arranged one above the other and which are joined at a first end in each case on a first securing device for support at the transportation vehicle structure side, wherein the first leaf spring has at the second end thereof a second securing device for wheel-side support and the second leaf spring can be supported at the second end thereof at the transportation vehicle structure side.

BRIEF DESCRIPTION OF THE DRAWINGS

Disclosed embodiments are explained in greater detail below with reference to the drawings, in which.

DETAILED DESCRIPTION

Figure 1:
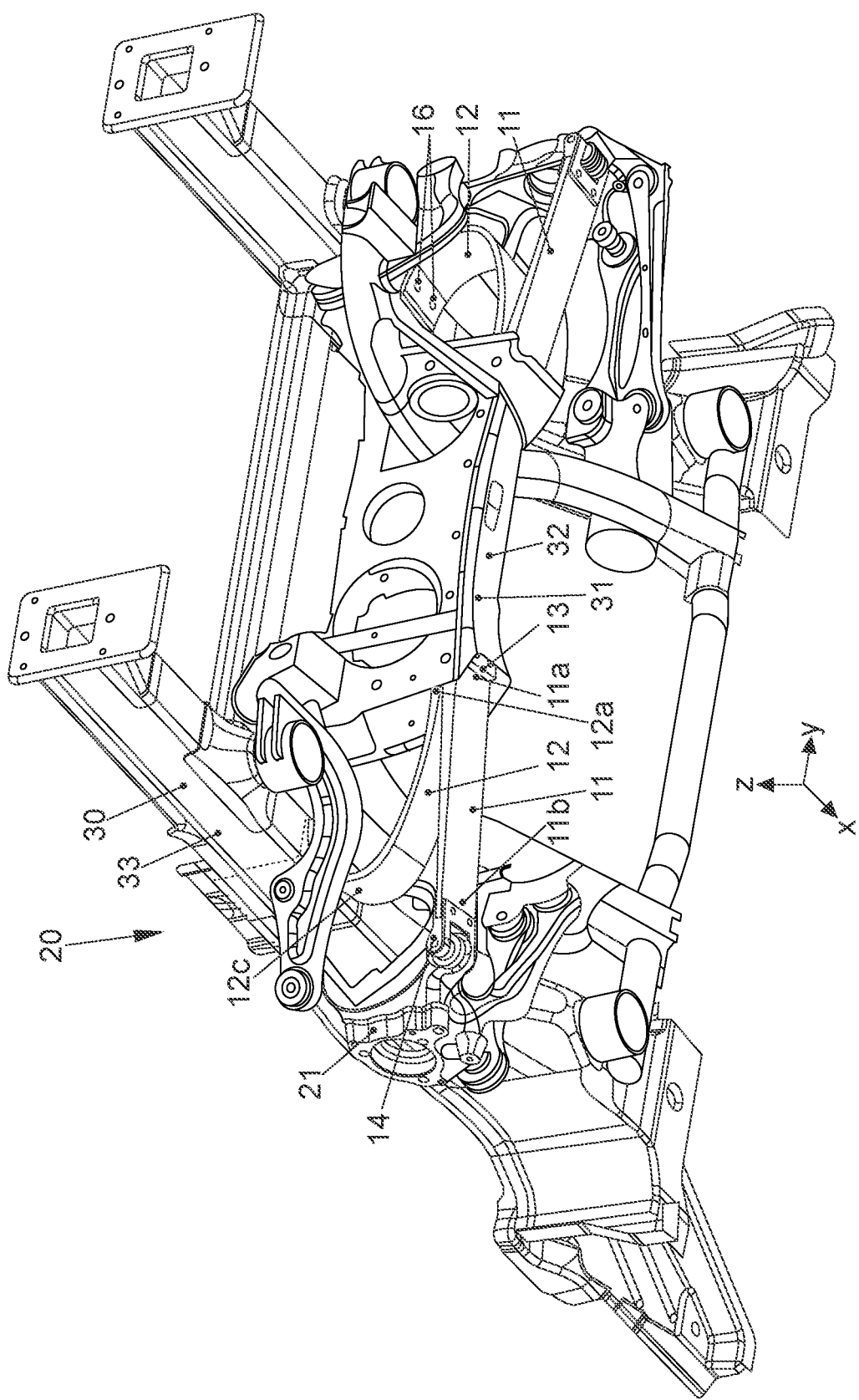
FIG. 1 shows a first exemplary embodiment of an X-shaped spring device in the installation position on a transportation vehicle in an idle position of the transportation vehicle on a horizontal surface.
Figure 2:
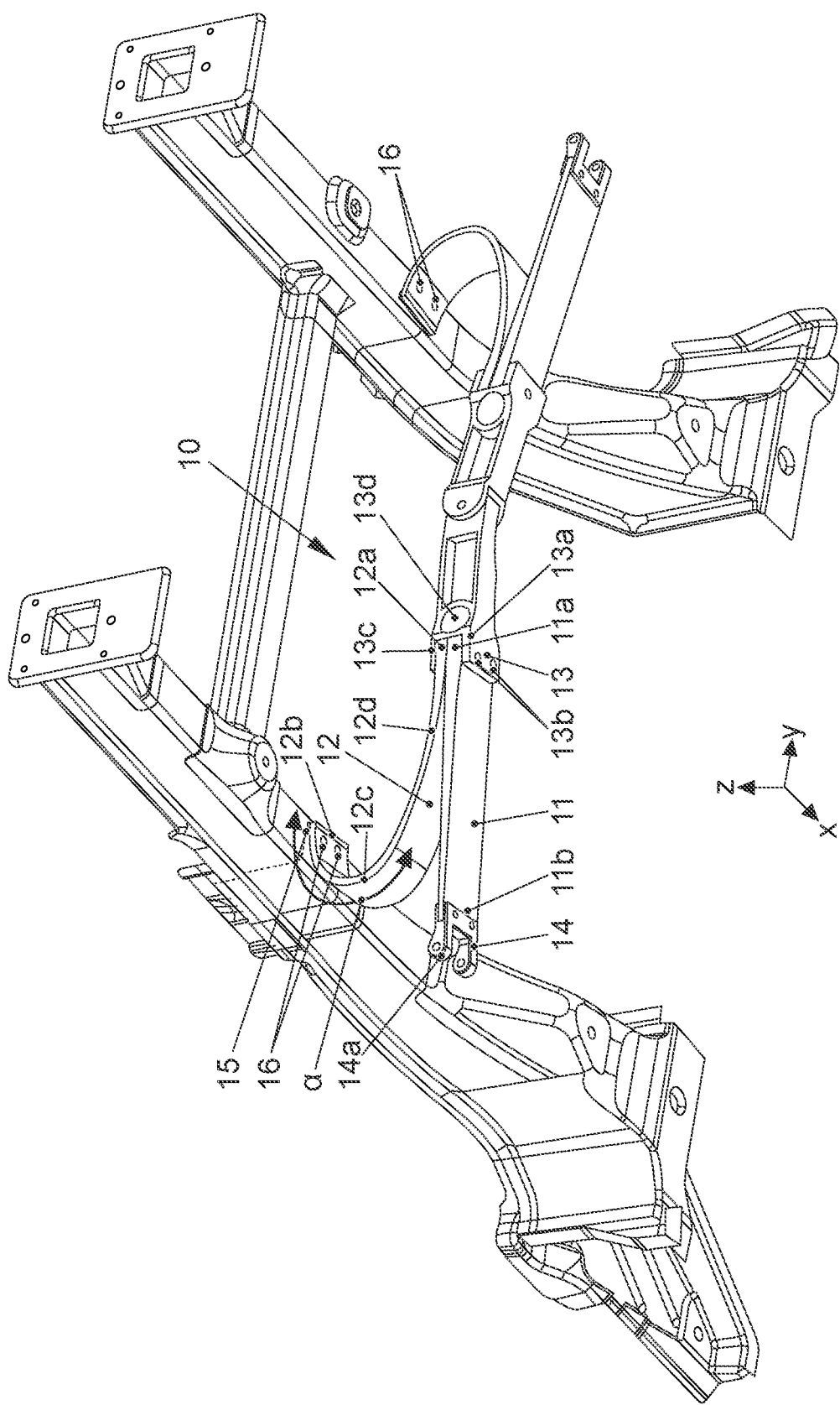
FIG. 2 is another illustration of the X-shaped spring device, with the auxiliary frame illustrated in FIG. 1 and the additional wheel connection structures of the transportation vehicle being omitted.

An X-shaped spring device of the type mentioned in the introduction is known from DE 10 2016 220 325 A1. The two leaf springs of this X-shaped spring device extend from the transportation vehicle center substantially linearly outward and form in this instance an acute angle of from 15° to 35° with each other. The second leaf spring located at the top is shorter than the first leaf spring and is connected via a coupling element from below to a portion of the transportation vehicle structure, in particular, a longitudinal carrier thereof.

The disclosed embodiments set out alternatives to this which are suitable, in particular, for transportation vehicles with a relatively large connection height.

This is achieved with an X-shaped spring device according to patent claim 1. The disclosed spring device is characterized in that the second leaf spring forms toward the second end thereof a curved portion which is curved away from the first leaf spring.

It is thereby possible in comparison with DE 10 2016 220 325 A1 to dispense with a long coupling element and to achieve a more stable connection of the second leaf spring to the transportation vehicle structure. This is particularly beneficial in transportation vehicles with longitudinal carriers which are arranged in a relatively high position, such as, for example, SUVs.

In addition, the second leaf spring is subjected to less stress as a result of comparatively more resilient material.

Via the two leaf springs there is a structure-side force introduction at two mutually spaced-apart locations, that is to say, on the one hand, via the second end of the second leaf spring, and via the region of the joined first ends of both leaf springs, whereby the corresponding structure-side structures on the transportation vehicle can be constructed to be less solid and consequently less heavy.

The disclosed X-shaped spring device can in a transportation vehicle wheel suspension replace conventional spring links with suspension springs which are supported thereon, where applicable also in such a manner that the conventional wheel and structure-side connection locations are retained.

The second leaf spring can thus be constructed in such a manner that the curved portion adjoins at the second end another curved portion or linear portion of the second leaf spring which has larger radii of curvature than the curved portion at the second end. This ensures a favorable loading of the second leaf spring.

Optionally, the curved portion extends at the second end of the second leaf spring over a curve angle in the range from 150 to 190°.

In particular, the second leaf spring may be configured in such a manner that the above-mentioned form is substantially already assumed in the unloaded state.

In contrast to DE 10 2016 220 325 A1, the extended length of the second leaf spring may be greater than the extended length of the first leaf spring so that the second leaf spring in this instance has a significantly increased energy absorption capacity.

In an exemplary embodiment, the second end of the second leaf spring in the installation position may face in the direction toward the transportation vehicle center so that the second leaf spring can abut without great complexity from below against a portion of the transportation vehicle structure. A direct connection to the transportation vehicle structure with an at most thin resilient layer of elastomer material or the like being interposed is possible in this instance.

In the installation position and when viewed in the direction toward the transportation vehicle longitudinal center axis, the second leaf spring may be constructed in a C-shaped manner, wherein the lower portion of the C-shape extends further in the direction toward the transportation vehicle center than the upper portion of the C-shape.

In particular, the second leaf spring may be arranged in such a manner that the side thereof which initially faces the first leaf spring subsequently faces toward the second end of the second leaf spring away from the first leaf spring.

Furthermore, at the inwardly curved second end of the second leaf spring, a spring support may be provided for support against a transportation vehicle structure from below, for example, to eliminate creaking noises.

According to another exemplary embodiment, the first leaf spring and the second leaf spring are constructed as separate components which are mutually tensioned at the first ends thereof. To this end, for example, the first securing device may have a clamp for mutually tensioning the first ends.

Furthermore, the first securing device may have a receiving member for a bearing for pivotable support on a transportation vehicle structure or an auxiliary frame which is provided on the transportation vehicle structure. As a result of such a pivotable support, in particular, relative movements which are produced as a result of the desired deformations of the leaf springs can be better compensated for. In addition, constraints can thereby be prevented.

The second securing device may have a bearing receiving member for pivotable support on a wheel carrier. Via this second securing device, in a wheel suspension vertical and transverse forces are transmitted from the wheel carrier to the first leaf spring. The pivotable articulation prevents constraints and opens a greater scope for configuration with regard to the fitting of additional wheel guiding members between the wheel carrier and the transportation vehicle structure. However, it is also possible, whilst ensuring corresponding levels of resilience, to secure the first leaf spring to the wheel carrier in a non-articulated manner, for example, to securely clamp it.

Furthermore, in this instance a transportation vehicle wheel suspension according to patent claim 10 is proposed. This wheel suspension comprises an X-shaped spring device of the above-mentioned type, wherein the first and the second leaf springs extend in each case in the transportation vehicle transverse direction or form therewith when viewed in a horizontal plane an angle of a maximum of +/−15°. When viewed in the longitudinal direction of the transportation vehicle, an X-shaped spring system is thereby produced, whose arms are formed by the total of four leaf springs—in each case, two leaf springs per wheel side.

A particularly light and cost-effective axle for a transportation vehicle is thereby provided. The disclosed solution is particularly suitable for rear axles of passenger transportation vehicles and light utility vehicles with an elevated connection of the second leaf spring, but without being limited to this.

The second leaf springs are in each case supported from below on a longitudinal carrier or a comparable portion of the transportation vehicle structure. In this instance, benefit is taken of the fact that the longitudinal carriers of a transportation vehicle generally have sufficient stability for supporting high forces so that the use of a leaf spring of fiber-reinforced plastics material at this location requires no additional reinforcement measures which would increase the overall weight of the transportation vehicle from a structural point of view.

As already indicated above, the disclosed spring device enables a particularly flat axle construction. In this instance, the lower first leaf springs in the installation position can extend in the idle position of the transportation vehicle horizontally on a horizontal surface or can form with a horizontal plane an angle of a maximum of +/−10°.

Furthermore, the first securing devices may be arranged in the transportation vehicle transverse direction in a central region, which is delimited in the transportation vehicle transverse direction by the longitudinal carriers of the transportation vehicle structure. In particular, it is possible to arrange the first securing devices in the transportation vehicle transverse direction with respect to the track width of the transportation vehicle in a central third, in particular, central fifth, about the longitudinal center axis. This enables a particularly great length of the leaf springs and consequently an accordingly high energy absorption capacity which in turn enables the mass of the transportation vehicle structure to be supported only via the leaf springs, whereby helical springs which are generally provided for this purpose may be able to be completely dispensed with.

Furthermore, for each pair comprising a first and second leaf spring a coupling member may be provided and continues it in the direction toward the transportation vehicle center beyond the point of the transportation vehicle-structure-side connection of the first securing device. The coupling members of both wheel sides may be connected to each other by an articulation to prevent a mutual deflection.

It is thereby possible, via the X-shaped spring device, in particular, the first leaf springs thereof, for the function of a stabilizer to be performed.

It is further possible for the respective coupling member to be constructed as a continuation on a first securing device which forms a clamp for the first and second leaf springs, whereby a particularly high functional integration in a single component is achieved.

The disclosed embodiment shows an X-shaped spring device 10 for a transportation vehicle wheel suspension in the installation position on a passenger transportation vehicle. The X-shaped spring device 10 has per wheel side a first leaf spring 11 and a second leaf spring 12.

Both leaf springs 11 and 12 are produced from a fiber-reinforced plastics material, for example, glass-fiber-reinforced plastics material (GFRP) or carbon-fiber-reinforced plastics material (CFRP). In the illustrated embodiment, they are configured as separate components. However, it is also possible to integrate the first and second leaf springs 11 and 12 for each wheel side in an integral member which is produced from fiber-reinforced plastics material.

The first and second leaf springs 11 and 12 are arranged one above the other so that with respect to the transportation vehicle vertical direction the second leaf spring 12 extends above the first leaf spring 11.

Both leaf springs 11 and 12 are joined at a first end 11a and 12a in each case on a first securing device 13 for support at the transportation vehicle structure side.

Furthermore, the first leaf spring 11 has at the second end 11b thereof a second securing device 14 for wheel-side support, whereas the second leaf spring 12 is supported at the second end 12b thereof on the transportation vehicle structure.

Whilst the first leaf spring 11 extends substantially linearly from the transportation vehicle center to the wheel side in an outward direction, the second leaf spring 12 forms in the direction toward the second end 12b thereof a curved portion 12c which is curved away from the first leaf spring 11.

The curved portion 12c at the second end 12b of the second leaf spring 12 seamlessly adjoins another curved portion 12d or linear portion of the second leaf spring 12 which has larger radii of curvature than the first-mentioned curved portion 12c at the second end 12b.

The curved portion 12c at the second end 12 of the second leaf spring 12 extends over a curve angle $\alpha$ in the range from 150 to 190°.

This shaping of the leaf springs 11 and 12 can also already be seen in the relaxed state of the X-shaped spring device 10.

If the second leaf spring 12 were extended in a linear manner, the extended length of the second leaf spring 12 would be greater than the extended length of the first leaf spring 11.

As a result of the curved portion 12c at the second end 12, the second leaf spring 12 has an increased energy absorption capacity in the event of deflection.

In the installation position on the transportation vehicle, the second end 12b of the second leaf spring 12 faces in the direction toward the transportation vehicle center. When viewed in the direction toward the transportation vehicle longitudinal center axis, the second leaf spring 12 is constructed in a C-shaped manner, wherein the lower portion of the C-shape extends further in the direction toward the transportation vehicle center than the upper portion of the C-shape.

The side of the second leaf spring 12 which initially faces the first leaf spring 11 at the first end 12a subsequently faces toward the second end 12b away from the first leaf spring 11.

At the correspondingly inwardly curved second end 12b of the second leaf spring 12, a spring support 15 may be provided for support against the transportation vehicle structure from below. The spring support 15 may, for example, be constructed as a strip of elastomer material which prevents direct contact of the fiber-composite material of the second leaf spring 12 with the transportation vehicle structure.

The first securing device 13 for support at the transportation vehicle structure side is located in the region of the joined first ends 11a and 12a on the first and second leaf spring 11 and 12. The X-shaped spring device 10 may be supported in the region of the joined first ends 11a and 12a directly on the transportation vehicle structure 30 or on a structure which is secured to the transportation vehicle structure, such as, for example, an auxiliary frame 31 or the like.

Furthermore, a second securing device 14 is located at the second end 11b of the first leaf spring 11. This second securing device 14 is used for the wheel-side support, for example, on a wheel carrier 21 or a wheel guiding member. Furthermore, a third securing device 16 is provided at the second end 12b of the second leaf spring 12 for securing at the transportation vehicle structure side.

As a result of the curved portion 12c of the second leaf spring 12, the support location thereof at the transportation vehicle structure side on the second end 12b is located with an arrangement of the X-shaped spring device 10 in the transportation vehicle transverse direction closer to the transportation vehicle center than the wheel-side support location of the first leaf spring 11.

The first and second leaf springs 11 and 12 may be directly tensioned with respect to each other at the joined first ends 11a and 12a thereof.

In the exemplary embodiment illustrated in FIG. 1, the first securing device 13 has a clamp 13a for mutually tensioning the first ends 11a and 12a of the first and second leaf springs 11 and 12. By using the clamp 13a, a rotational movement of the first leaf spring 11 which results from a deflection and a deformation thereof can further also be transmitted to the second leaf spring 12 and vice versa.

The clamp 13a may, for example, be configured as a fork-like claw in which the first ends 11a and 12a of the first and second leaf spring 11 and 12 are introduced. The configuration of the clamp 13a is, however, not limited to the shape of such a claw. Instead, other embodiments are also possible here. A clamping can be carried out by clamping bolts 13b. Via corresponding flange portions 13c of the claw, a uniform distribution of the clamping force over the surface of the first ends 11a and 12a is achieved.

Furthermore, the first securing device 13 has a pivotable bearing of the spring device 10. To this end, the first securing device 13 may, for example, have a receiving member 13d for a bearing for pivotable support on the transportation vehicle structure 30 or an auxiliary frame 31 which is provided on the transportation vehicle structure. In the embodiment illustrated, for example, a bearing lug is integrated into the first securing device 13 for this purpose. As a receiving member 13d for a bearing, however, it is also possible to use, for example, a bearing bolt or the like, via which a pivotable bearing can be produced.

The second securing device 14 may, for example, have a bearing receiving member 14a for pivotable support on a wheel carrier. FIG. 1 shows to this end, purely by way of example, a bearing receiving member 14 which is constructed as a fork and via which, for example, a rubber bearing can be received. As already explained in the context of the first securing device 13, however, in principle other structures, such as, for example, a bearing bolt or the like, are also possible as a bearing receiving member 14a.

The third securing device 16 for securing the second end 12b of the second leaf spring 12 comprises in the simplest case only one or more securing methods or mechanisms, such as clamping bolts and the like. Any relative movements with respect to the transportation vehicle structure or the structure which is secured to the transportation vehicle structure, which movements as a result of the deformation of the X-shaped spring device 10 can hardly be avoided, are effectively compensated for by the curved portion 12c of the second leaf spring 12. At this location, however, where applicable, an articulated coupling may additionally be provided to introduce an additional degree of freedom.

The incorporation of such an X-shaped spring device 10 into a transportation vehicle wheel suspension 20 can be readily seen in FIG. 1.

The wheel suspension 20 comprises for each transportation vehicle wheel a wheel carrier 21 which is supported via a plurality of wheel guiding members against the transportation vehicle structure 30 or a structure which is secured to the transportation vehicle structure, such as an auxiliary frame 31, and additional wheel guiding members, for example, as transverse links.

The present wheel suspension 20 is sufficient for supporting the transportation vehicle mass without a helical spring. The function thereof is in this instance taken over by the X-shaped spring device 10. However, it is also possible, in a wheel suspension 20 which contains an X-shaped spring device 10 of the above-mentioned type, to additionally use conventional helical springs to support the transportation vehicle mass.

The wheel suspension 20 illustrated is only of exemplary nature to explain the installation position of the X-shaped spring device 10 in such a suspension in greater detail. It must therefore be expressly emphasized that corresponding spring devices 10 in wheel suspensions 20 other than those illustrated can also be used to support the mass of the transportation vehicle structure against the transportation vehicle wheels and where applicable additionally take on wheel guiding functions.

The X-shaped spring device 10 explained above is installed in the wheel suspension 20 in such a manner that the first and second leaf springs 11 and 12 extend in each case in the transportation vehicle transverse direction y or form an angle of a maximum of +/−15° with the transportation vehicle transverse direction y when viewed in a horizontal plane xy.

The first leaf spring 11 is located in this instance below the second leaf spring 12 with respect to the transportation vehicle vertical direction z.

Furthermore, the X-shaped spring device 10 extends a significant distance in the direction toward the transportation vehicle center, whereby for the first and second leaf springs 11 and 12 a significant length with correspondingly high energy absorption capacity is produced. As a result of the selected X-shape, the structural height in the transportation vehicle vertical direction z remains low.

In the idle position of the transportation vehicle on a horizontal surface, the first leaf springs 11 extend in a primarily horizontal manner, that is to say, they form with a horizontal plane xy an angle of a maximum of +/−10°.

As shown in FIG. 1, the X-shaped spring device 10 may in the region of the first securing device 13 be articulated to a transverse strut 32 of the auxiliary frame 31.

To produce the greatest possible length of the X-shaped spring device 10 in the transportation vehicle transverse direction y, the first securing devices 13 are arranged in the transportation vehicle transverse direction y, with respect to the track width of the transportation vehicle, optionally in a central third or in a central fifth, about the longitudinal center axis of the transportation vehicle. The connection to the auxiliary frame 31 is carried out, for example, by a rubber bearing in the receiving member 13d of the first securing device 13 so that the leaf spring pairs of each wheel side can pivot about a rotation axis which extends in the transportation vehicle longitudinal direction x.

The X-shaped spring device 10 may be pivotably connected by an additional rubber bearing to the wheel carrier 21. This additional rubber bearing couples the second end 11b of the first leaf spring 11 in an articulated manner to the wheel carrier 21, wherein the associated pivot axis of the joint which is formed in this manner also primarily extends in the transportation vehicle longitudinal direction x. However, it is also possible for the second end 11b of the first leaf spring 11 to be received, for example, in a clamp on the wheel carrier 21, that is to say, in an unarticulated manner.

Finally, the X-shaped spring device 10 is supported with the second end 12b of the second leaf spring 12 on the transportation vehicle structure 30. The structure-side introduction of force is thereby distributed over two locations. Such a support of the second leaf spring 12 may, for example, as shown in FIG. 1, be carried out on a longitudinal carrier 33 of the transportation vehicle structure 30. The support is carried out from below in this instance.

The first securing devices 13 of the two wheel sides are arranged in the transportation vehicle transverse direction in a central region, which is delimited in a transportation vehicle transverse direction by the longitudinal carriers 33 of the transportation vehicle structure 30.

Optionally, the first securing devices 13 may be coupled in an articulated manner to each other at the transportation vehicle center, as described in DE 10 2016 220 325 A1, via the X-shaped spring arrangement 10 to additionally perform the function of a stabilizer since with a mutual deflection the X-shaped spring device 10 stiffens. A separate stabilizer is consequently superfluous.

The disclosed embodiments enable a flat transportation vehicle axle with a low luggage space edge or cargo space edge and a great luggage space width or cargo space width.

As a result of the upwardly drawn curved portions 12c of the second leaf spring 12, a use in transportation vehicles is possible in which the second leaf spring 12 is nonetheless intended to or has to be supported at the second end 12b thereof at a relatively high location.

The weight benefit of the leaf springs 11 and 12 of fiber-reinforced plastics material may be converted practically completely into a weight reduction of the transportation vehicle weight since, in the region of the structure-side connection of the X-shaped spring devices 10, no weight-increasing reinforcement measures, which would impair the weight benefit of the X-shaped spring devices 10 with the first and second leaf springs 11 and 12 of fiber-reinforced plastics material, are required.

The disclosure has been explained in greater detail above with reference to an exemplary embodiment and additional modifications. The disclosed embodiments and the modifications serve to substantiate the ability of the disclosure to be carried out. Individual technical features which were explained above in the context of additional individual features can also be implemented independently of these, and in combination with other individual features, even if this is not expressly described as long as this is technically possible. The disclosure is therefore expressly not limited to the specifically described embodiment, but instead comprises all the embodiments defined by the patent claims.

LIST OF REFERENCE NUMERALS

10 Spring device
11 First leaf spring
12 Second leaf spring
11a First end of the first leaf spring 11
11b Second end of the first leaf spring 11
12a First end of the second leaf spring 12
12b Second end of the second leaf spring 11
12c Curved portion
12d Additional curved portion or linear portion
13 First securing device
13a Clamp
13b Clamping bolt
13c Flange portion
13d Bearing receiving member
14 Second securing device
14a Bearing receiving member
15 Spring support
16 Third securing device
20 Transportation vehicle wheel suspension
21 Wheel carrier
30 Transportation vehicle structure
31 Auxiliary frame
32 Transverse strut
33 Longitudinal carrier
x Transportation vehicle longitudinal direction
y Transportation vehicle transverse direction
z Transportation vehicle vertical direction
α Curve angle

The invention claimed is:

1. An X-shaped spring device for a transportation vehicle wheel suspension, the transportation vehicle including a first wheel side and a second wheel side, the X-shaped spring device comprising:
    a first leaf spring and a second leaf spring arranged on each of the first wheel side and the second wheel side, each of the first and second leaf springs being formed of fiber-reinforced plastics material, each of the first and second leaf springs being arranged one above the other and joined at first ends on a first securing device for support at a transportation vehicle structure side,
    wherein the first leaf spring has, at a second end, a second securing device for wheel-side support,
    wherein the second leaf spring is supported at a second end at the transportation vehicle structure side,
    wherein the second leaf spring forms a curved portion curved away from the first leaf spring toward the second end of the second leaf spring,
    wherein a first surface of the second leaf spring which initially faces the first leaf spring subsequently faces toward the second end of the second leaf spring away from the first leaf spring, and
    wherein the second end of the second leaf spring is attached to an underside of a longitudinal carrier of the transportation vehicle located adjacent the transportation vehicle structure side.

2. The X-shaped spring device of claim 1, wherein the curved portion adjoins at the second end of the second leaf spring another curved portion or linear portion of the second leaf spring, which has larger radii of curvature than the curved portion at the second end.

3. The X-shaped spring device of claim 1, wherein the curved portion extends at the second end of the second leaf spring over a curve angle in the range from 150 to 190°.

4. The X-shaped spring device of claim 1, wherein an extended length of the second leaf spring is greater than an extended length of the first leaf spring.

5. The X-shaped spring device of claim 1, wherein the second end of the second leaf spring faces in a direction toward the transportation vehicle center.

6. The X-shaped spring device of claim 1, wherein the second leaf spring, in an installation position and when viewed in a direction toward a transportation vehicle longitudinal center axis, is constructed in a C shape.

7. The X-shaped spring device of claim 1, wherein, at an inwardly curved second end of the second leaf spring, a spring support is provided for support against a transportation vehicle structure from below.

8. The X-shaped spring device of claim 1, wherein the first securing device has a clamp for mutually tensioning the first ends of the first and second leaf springs, and/or the first securing device has a receiving member for a bearing for pivotable support on a transportation vehicle structure or a structure which is secured to a transportation vehicle structure that includes an auxiliary frame provided on the transportation vehicle structure.

9. A transportation vehicle wheel suspension comprising the X-shaped spring device of claim 1, wherein the first leaf springs extend in each case in a transverse direction of the transportation vehicle or form therewith when viewed in a horizontal plane an angle of a maximum of +/−15° and/or the first leaf springs in an idle position of the transportation vehicle extend horizontally on a horizontal surface or form with a horizontal plane an angle of a maximum of +/−10°.

10. The transportation vehicle of claim 9, wherein, in the X-shaped spring device, the curved portion adjoins at the second end of the second leaf spring another curved portion or linear portion of the second leaf spring, which has larger radii of curvature than the curved portion at the second end.

11. The transportation vehicle of claim 9, wherein, in the X-shaped spring device, wherein the curved portion extends at the second end of the second leaf spring over a curve angle in the range from 150 to 190°.

12. The transportation vehicle of claim 9, wherein, in the X-shaped spring device, wherein an extended length of the second leaf spring is greater than an extended length of the first leaf spring.

13. The transportation vehicle of claim 9, wherein, in the X-shaped spring device, the second end of the second leaf spring faces in a direction toward the transportation vehicle center.

14. The transportation vehicle of claim 9, wherein, in the X-shaped spring device, the second leaf spring, in an installation position and when viewed in a direction toward a transportation vehicle longitudinal center axis, is constructed in a C shape.

15. The transportation vehicle of claim 9, wherein, in the X-shaped spring device of claim 1, wherein, at an inwardly curved second end of the second leaf spring, a spring support is provided for support against a transportation vehicle structure from below.

16. The transportation vehicle of claim 9, wherein, in the X-shaped spring device, the first securing device has a clamp for mutually tensioning the first ends of the first and second leaf springs, and/or the first securing device has a receiving member for a bearing for pivotable support on a transportation vehicle structure or a structure which is secured to a transportation vehicle structure that includes an auxiliary frame provided on the transportation vehicle structure.

* * * * *